United States Patent [19]

Gahlaü et al.

[11] Patent Number: 4,574,915

[45] Date of Patent: Mar. 11, 1986

[54] SOUND BARRIERS

[75] Inventors: Heinemann Gahlaü, Celle; Manfred Hoffmann, Nienhof; Klaus Wittenmayer, Uetze, all of Fed. Rep. of Germany

[73] Assignee: Dr. Alois Stankiewicz GmbH, Adelheidsdorf, Fed. Rep. of Germany

[21] Appl. No.: 680,575

[22] Filed: Dec. 11, 1984

[30] Foreign Application Priority Data

Dec. 21, 1983 [DE] Fed. Rep. of Germany ....... 3346260

[51] Int. Cl.⁴ .................................................. E04B 1/82
[52] U.S. Cl. ..................................... 181/290; 181/294; 181/296
[58] Field of Search ................ 181/204, 284, 290–292, 181/294, 200, 296

[56] References Cited

U.S. PATENT DOCUMENTS

| | | | |
|---|---|---|---|
| 3,589,971 | 6/1971 | Reed | 181/200 X |
| 3,712,846 | 1/1973 | Daniels et al. | 181/290 X |
| 3,920,872 | 11/1975 | Ollinger | 181/284 X |
| 4,129,672 | 12/1978 | Momura et al. | 181/290 X |
| 4,441,580 | 4/1984 | Webster | 181/290 X |

Primary Examiner—Benjamin R. Fuller
Attorney, Agent, or Firm—Lewis H. Eslinger

[57] ABSTRACT

In order to subject sound-emitting surfaces of motor vehicles to localized interference with the sound field, for example, sound obstruction and attenuation, it is already known to insulate the region of the sound sources against noise by cladding the passenger space from within at the relevant point of the wall to be insulated by application of a heavy layer and of a resilient layer which, if necessary, is impregnated with a sound-attenuating material. However, limits are imposed on a sound-insulating cladding of this kind even when further sound-reducing materials are applied, as the transmission of sound energy to the interior space of the motor vehicle then takes place in other ways.

In order to remedy this, at least one sound sink is subjected to intensified sound absorption by providing on the wall (2,3) a sound-insulating cladding (6/7). Specifically this cladding comprises a resilient layer (6) preferably made of foam material or fleece which is covered by a heavy layer (7).

13 Claims, 2 Drawing Figures

SOUND BARRIERS

BACKGROUND OF THE INVENTION

This invention relates to sound barriers such as the sound barrier which can be constituted by the front bulkhead and front foot well area of a motor vehicle.

DESCRIPTION OF THE PRIOR ART

It is known to form a wall as a sound barrier by providing that where the wall has sound sources and sound sinks distributed thereon, the sound field is interfered with by fitting against the wall a cladding in the form of a shaped piece or a plate which consists of a heavy layer and a resilient layer. This cladding is fitted against the wall to be insulated in the region of the sound sources. Particular examples of walls formed as sound barriers in this way are to be found in motor vehicles as disclosed in German Auslegeschrift No. 27 32 483, wherein sound-insulating claddings mainly added inside the passenger compartment of a vehicle are fitted to body panels of the vehicle. In this way, obstruction of air-borne-sound is improved and this results in a reduction in noise in the passenger compartment. The effectiveness of measures of this kind is, however, limited as the effect of a sound-insulating cladding of this kind on the front bulkhead and the front foot well of a motor vehicle can only be improved to the extent permitted by the so-called acoustic by-pass transmissions. If this limit is reached, further improvement of the sound insulation, for example by application of additional sound-reducing materials, is no longer of any use as sound energy is then transmitted to the interior space (the passenger compartment) in other ways. With this knowledge and on account of a vehicle manufacturer's handicaps constraining him to limit the bulk of the sound insulation in terms of weight and also, among other things, in order to save energy, methods have already been developed for locating certain regions of the front bulkhead and of the front foot well area which act as sound sources. These sound sources are acoustic radiators. In addition, there are sound sinks which absorb sound energy. The technique for locating such sound sources and sound sinks in a motor vehicle is generally known and is carried out by an intensity measuring method, as described for example in the aforementioned German Auslegeschrift No. 27 32 483. It is pointed out in detail in this Auslegeschrift that treatment of the sound sources to attenuate the sound field is particularly important and a method of carrying out such treatment is disclosed. In carrying out this known method it has now been recognised in practice that in many cases simply treating the sound sources is not enough to bring about satisfactory sound field attenuation, particularly in the ignition frequency range which lies between approximately 100 and 200 Hz in the case of 4 cylinder engines and at which standing waves form in the motor vehicle.

SUMMARY OF THE INVENTION

According to the present invention there is provided a sound barrier comprising a wall having sound-emitting surfaces with sound sources and at least one sound sink distributed thereon, and a shaped sound-insulating cladding fitted against the wall to interfere with the sound field such that the at least one sound sink is subjected to intensified sound absorption. In this sound barrier, sound-insulating cladding can be retained in the region of the sound sources as hitherto and, in addition, there is a possibility of obtaining a further effective reduction in the level of sound at the place where it acts, for example at the driver's ear where the sound barrier is in a motor vehicle.

As will be explained hereinafter, space not previously used for the purpose of sound insulation, situated beyond the sound barrier and containing the producer of the noise, can be acoustically coupled to the sound barrier.

In contrast to what has been known, increased drain of energy is not effected by weakening the sound-insulating layer, but rather by strengthening it. This is done by inserting in a region recognised as a sound sink, a resilient layer which is as soft as possible, formed, for example, by a layer of foam material or fleece, with a superimposed heavy layer. In this way, where the sound barrier is in a motor vehicle, a mass and spring system having a resonant frequency tuned to the ignition frequency of the vehicle can be formed locally. A local reduction in sound obstruction is thus intentionally brought about.

BRIEF DESCRIPTION OF THE DRAWING

For a better understanding of the invention and to show how the same may be carried into effect, reference will now be made, by way of example, to the accompanying drawing, in which.

DETAILED DESCRIPTION OF A PREFERRED EMBODIMENT

Figure 1:
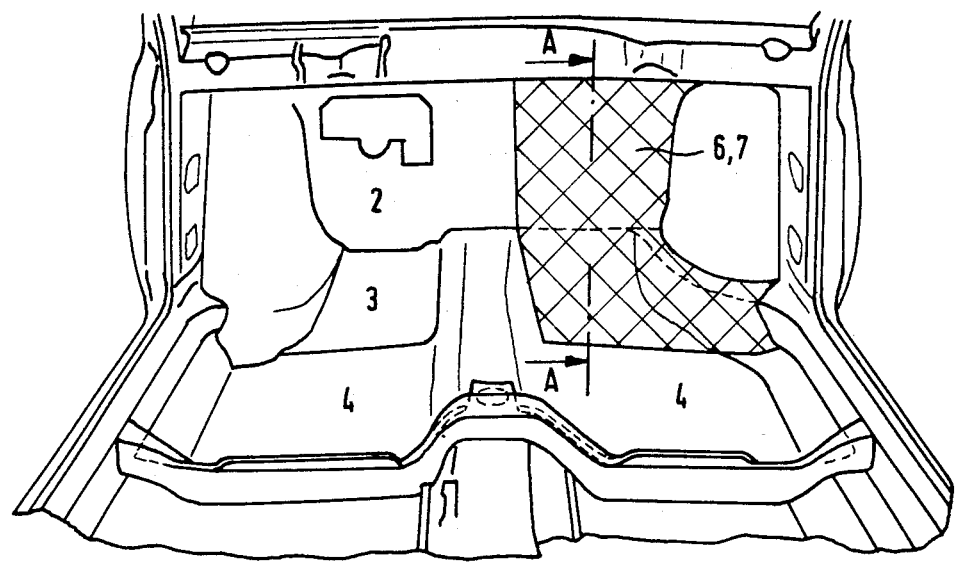
FIG. 1 shows the lower portion of the front bulkhead and front foot well area of a motor vehicle in a diagrammatic view as seen from the inside looking towards the front and having, in part, a sound-obstructing and sound-attenuating cladding.
Figure 2:
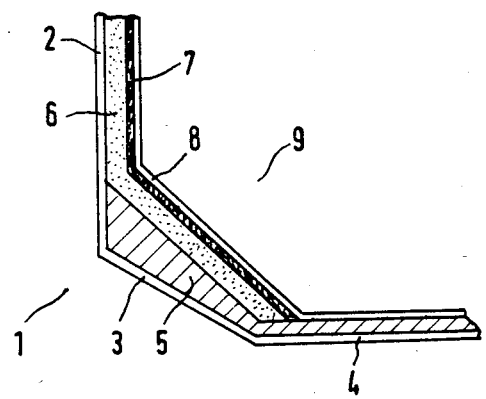
FIG. 2 is a section taken along line A—A in FIG. 1.

As shown in FIG. 2, a sound-insulating cladding, which is formed by a shaped piece of foam material, is secured at a particular location as will be explained below on that face of the front bulkhead 2 and the inclined wall 3 of one of the foot wells ¾ of the body of the motor vehicle which is remote from the producer of the noise. In other words the cladding is fitted to the face remote from the engine compartment The cladding is of multilayered construction and has a relatively thick soft-elastic or viscous-elastic resilient layer of foam material 6, covered by a heavy layer 7 on that face which is remote from the bulkhead 2 and a foot well wall 3. A wedge-shaped portion 5 of heavy foam for preserving the contour is placed between the foot well wall 3 and the layer of foam material 6. A layer of heavy foam 5 is also provided on that side of the floor wall 4 of the foot well which faces the passenger compartment 9.

A carpet 8 is laid over the whole surface on the side of the sound-insulating cladding which faces the passenger compartment 9.

It is to be noted that the sound-insulating cladding (without carpet 8) could be fitted on the engine compartment 1 face instead of on the face remote from the engine compartment 1. However, fitting to the face remote from the engine compartment, as illustrated, is more advantageous as this face is generally more accessible than the other face.

The cladding that has just been described is fitted such that in the sound barrier which is the bulkhead and foot well wall area so-clad, the sound field is interfered with and at least one sound sink is subjected to intensified sound absorption. In order to achieve this, the region to be sound-insulated is—as is known (see above)—first investigated to see whether at certain points the sound-intensity vector is directed from the inside towards the outside. Several regions which act as sound sinks may be found by such an investigation. The sink which lies next to the greatest sound source is determined and treated in order to absorb the sound energy by the shortest route and thereby affect the sound field so as to reduce noise. A technological advance is thus achieved through savings in material and even more because a marked reduction in the low frequency level components is caused, something which cannot very often be achieved just by treatment of the sound sources in the ignition frequency range between, in the case of 4 cylinder engines, approximately 100 and 200 Hz.

Known soft-elastic or viscous-elastic foams and also all porous and fibrous materials are particularly suitable as materials for the desired treatment of sound sinks. The sound-obstructing heavy layers may be either non-rigid or rigid, in terms of bending, rigid layers being particularly favoured as providing firmness of tread.

Preferably, the sound-obstructing heavy layer 7 has a mass per unit area of between 2 and 16kg/m$^2$, which covers a resilient layer 6 made of porous or fibrous materials.

The resilient layer 6 can be of fleece, or of paper, textile or plastics foils which enclose an air space. It can be impregnated with a sound-attenuating material.

The sound-insulating cladding 6/7 can be glued, connected self-adhesively with, or is loosely laid upon the bulkhead 2 and foot well wall 3.

Sound barriers as described with reference to the drawing are particularly suitable for sound insulation in motor vehicles, for which shaped pieces, which conform to the contours of the front bulkhead and of the front foot well areas, are used in a known way. The regions for special treatment of the sound sinks are integral parts of the shaped pieces forming the whole claddings so that the required contours are preserved overall. Such sound barriers can also be used for other surfaces of a motor vehicle, or of any space which is to be sound-insulated.

What is claimed is:

1. A sound barrier for sound field interference on sound-emitting surface forming a front wall of a motor vehicle, wherein sound sources and at least one sound sink having a locally different distribution are associated with said sound-emitting surfaces, with a shaped sound-insulating cladding abutting said wall at said sound-emitting surface to interfere with the sound field, said shaped sound-insulating cladding including a sound-obstructing heavy layer and a resilient layer forming a mass/spring damping system in the area of said at least one sound sink, whereby said at least one sound sink is subjected to intensified sound absorption.

2. A sound barrier as claimed in claim 1, wherein the sound-insulating cladding is provided on that face of the wall which is remote from the producer of the noise.

3. A sound barrier as claimed in claim 1 or 2, wherein said sound-obstructing heavy layer has a mass per unit area of between 2 and 16 kg/m$^2$ of its surface which covers said resilient layer made of porous or fibrous materials.

4. A sound barrier as claimed in claim 3, wherein the resilient layer is made of soft-elastic foam material.

5. A sound barrier as claimed in claim 2, wherein the resilient layer is made of fleece 6. A sound barrier as claimed in claim 1 or 2, wherein the resilient layer is made of paper, textile or plastics foils which enclose an air space.

7. A sound barrier as claimed in claim 3, wherein the resilient layer is impregnated with a sound-attenuating material.

8. A sound barrier as claimed in claim 3, wherein the sound-insulating cladding is glued to the wall.

9. A sound barrier as claimed in claim 3, wherein the region of the sound-insulating cladding that serves to intensify sound absorption at the sound sink is an integral part of the cladding as a whole.

10. A sound barrier as claimed in claim 3, wherein the cladding is fitted to the front bulkhead and front foot well area of a motor vehicle, and including a layer of heavy foam between the foot well wall and the resilient layer.

11. A method for sound field interference on the walls of sound-emitting surfaces that form the front wall of a passenger compartment of a motor vehicle, comprising the steps of locating on said sound-emitting surfaces, sound sources and sound sinks, said sound sources and sound sinks having locally different distributions over said sound-emitting surfaces; forming a sound-insulating covering in substantially the shape of said sound-emitting surfaces; arranging said sound-insulating covering against said sound-emitting surfaces for interferring with and deadening the sound field; wherein said step of forming said sound-insulating covering includes the steps of forming said covering of at least two layers, a first layer being a sound-obstructing heavy layer and a second layer being a resilient layer, and forming a sound-insulating mass/spring sound damping system by use of said first and second layers; and arranging said sound insulating mass/spring system at a location corresponding to a location of said sound sinks, and increasing dissipation of sound energy within the area of said sound sinks from the interior of the motor vehicle to the outside thereof.

12. A method according to claim 11, wherein said sound insulating mass/spring system is adapted to have a frequency corresponding to the ignition frequency of the motor vehicle.

13. A method according to claim 11, wherein said sound-obstructing heavy layer is selected to have a mass per unit area of between 2 and 16 kg/m$^2$.

* * * * *